H. Mellish.

Making Wooden Ware.

No. 3,309. Reissued Feb. 23, 1869.

Witnesses:
Geo. Coombs
G. W. Reed

Inventor;
H. Mellish
per Munn & Co
Attorneys.

N. PETERS, PHOTO-LITHOGRAPHER, WASHINGTON, D. C.

UNITED STATES PATENT OFFICE.

DAVID LYMAN, OF MIDDLEFIELD, CONNECTICUT, AND SIDNEY FAIRBANK AND WASHINGTON WHITNEY, OF WINCHENDON, MASSACHUSETTS, ASSIGNEES OF HENRY MELLISH, OF WALPOLE, NEW HAMPSHIRE.

IMPROVEMENT IN HOLLOW WOODEN WARE.

Specification forming part of Letters Patent No. 42,675, dated May 10, 1864; Reissue No. 3,309, dated February 23, 1869.

*To all whom it may concern:*

Be it known that HENRY MELLISH, of Walpole, in the county of Cheshire and State of New Hampshire, has invented a new and useful Improvement in the Manufacture of Hollow Wooden Ware; and the following is hereby declared to be a full, clear, and exact description of the same, reference being had to the accompanying drawings, in which—

Figure 1:
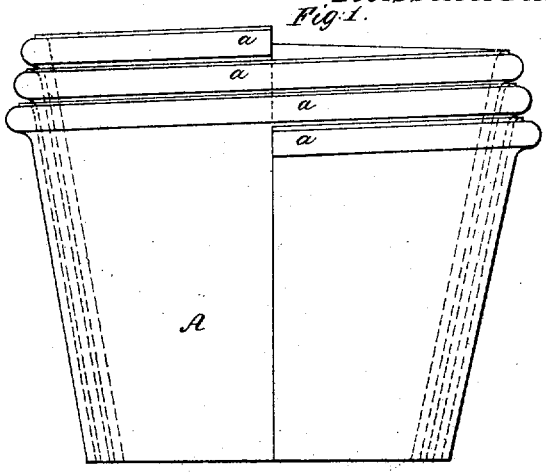
Figure 1:
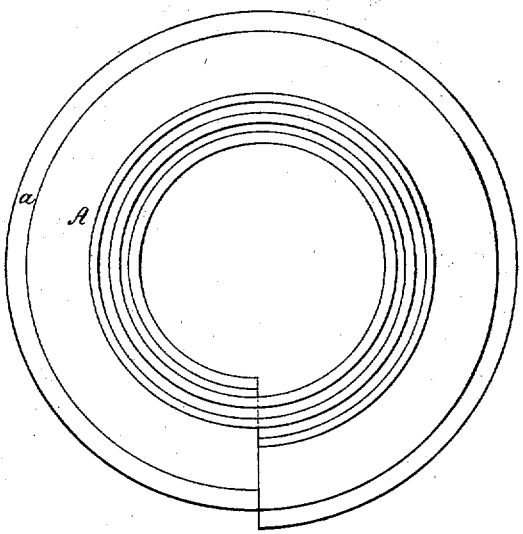
Figure 1:
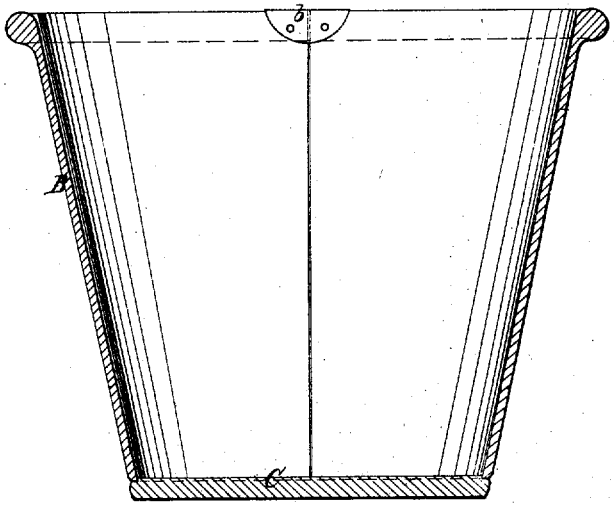

Figure 1 represents a strip or scroll of wood used in the manufacture of hollow wooden ware in accordance with this invention. Fig. 2 is an inverted plan of the same. Fig. 3 is a vertical central section of a fruit-basket made in accordance with this invention.

This invention may be stated to consist, first, in an article of hollow wooden ware made from a strip of wood, consisting of a helical coil or scroll, each fold of which will constitute the frustum of a cone; second, in an article of hollow wooden ware made from a strip or scroll of wood cut in the manner hereinafter specified, but so as at the same time to form on its upper edge a bead or molding, for the purposes hereinafter indicated; third, in combining with the body of the article of wooden ware thus produced a bottom having an annular groove, in which the lower edge of the wooden scroll is inserted, whereby the body of the article is held in shape by means of the bottom, and without the aid of hoops or other devices; fourth, in holding together the upper ends of the contiguous edges of the wooden scroll from which the body of the article is formed, whether said body be combined with a bottom such as described or not, by means of a clasp or fastening device, applied substantially in the manner hereinafter set forth.

To enable those skilled in the art to make and use this invention, the manner in which the same is or may be carried into effect will now be described by reference to the accompanying drawings.

A represents a wooden strip or scroll, having the form of a helical coil, each fold of which will constitute what may be termed the "frustum of a cone," as indicated by the dotted lines in Fig. 1. This strip is produced by placing the cutter at such an angle to the axis of the log or cylinder of wood from which the strip is to be cut that the plane of the cutter shall intersect said axis, so that when the log is revolved and fed toward the knife, or vice versa, in the manner well known to those skilled in the art to which this invention pertains, a spiro-conical cut will be produced. This will be manifest by reference to Figs. 1 and 2, supposing the dotted lines to represent the path of the knife in cutting out the spiro-conical scroll, from which it will be perceived that the cut is at an angle to the axis of the cylinder or log, each revolution of the log or the knife forming one of the series of the conical frusta which constitute the strip.

The advantage which results from thus cutting the log is great. It is well known that the body of the tree from which the log is cut has a cellular formation, and that the fiber or grain of the wood runs in a direction generally parallel with the axis of the trunk, the layers of cells which contain the sap and juices, of course running in a like direction. If, therefore, the path of the knife were parallel with the axis of the log, but few of the cells would be cut open; the sap and juice would not be free to escape; the seasoning of the article, when made, would consume much time; it would be liable to contract, and warp, and split, and, in fact, could not successfully be made, save from timber already thoroughly seasoned; but by placing, as in the present instance, the knife at an angle to the log, the result is entirely different. In its oblique path through the wood, it cuts across and through the cells, thus opening them, and allowing the sap and juices contained therein to escape without hinderance, so that the strip, or the article or articles made from it, can be seasoned in a very short period, at the same time that the wood is rendered less liable to warp and crack. The helical strip produced in this manner may be perfectly smooth and of uniform thickness; or it may be provided with a strengthening and stiffening bead or molding, *a*, at the top edge, formed at the same time with the body of the strip, as shown in the drawings; or it may be still further ornamented and strengthened by moldings of various forms and descriptions.

The length of the strip depends, of course, upon the diameter of the cylinder from which it is cut and the quality of timber, for it is obvious that timber of the best quality only, when treated in the proper manner, will permit of being cut spirally to any considerable extent.

From the helical strip A are cut off sections of greater or less length, to make the various kinds of hollow ware, such as fruit-baskets, measures, sieves, &c.

The fruit-basket B (represented in Fig. 3 of the drawings) is made of a segment cut from the strip A. The contiguous edges of this segment are secured together at the top by a clasp, *b*, and its bottom edge is set and held in an annular groove of suitable shape formed in the bottom C, and may be further secured therein by glue or other suitable means. The bottom thus serves to hold the segment in proper shape without the aid of hoops and other devices; and in this connection it may be noted that the clasp *b* can be employed to unite the edges of the segment at the top, whether the bottom B or any other suitable bottom be used. By these means a strong and durable and at the same time a very light basket is produced. Its top edge is strengthened by the bead *a*, and the bottom edge is rendered rigid and protected by the bottom C. From this example it will be easily understood how articles of different shapes and intended for different uses can be made in the same or substantially the same manner.

What is claimed as the invention of the said HENRY MELLISH is as follows:

1. An article of hollow wooden ware the body of which is made from a strip of wood cut from the log or stock in the form of a spiro-conical coil or scroll, substantially in the manner described.

2. Forming upon the upper edge of the scroll or strip of wood, cut in the manner described, so as to constitute the body of the article, a strengthening or stiffening bead or molding, substantially as and for the purposes specified.

3. The combination, with the body of the article of wooden ware thus produced, of a bottom grooved to receive and hold the lower edge of the said body, whereby the body is maintained in shape by means of the bottom and without the aid of hoops and other devices.

4. Uniting the upper ends of the contiguous edges of the wooden scroll which forms the body of the article of wooden ware, whether the same be combined with a bottom such as described or not, by means of a clasp or fastening device, applied substantially as herein shown and set forth.

In testimony whereof we have hereunto set our hands to this specification in the presence of subscribing witnesses.

DAVID LYMAN.
SIDNEY FAIRBANK.
WASHINGTON WHITNEY.

Witnesses:
LYMAN A. MILLS,
E. S. MERRILL,
GEO. W. CONVERSE,
A. POLLOK,
M. BAILEY.